(12) United States Patent
Homola

(10) Patent No.: US 6,391,213 B1
(45) Date of Patent: May 21, 2002

(54) TEXTURING OF A LANDING ZONE ON GLASS-BASED SUBSTRATES BY A CHEMICAL ETCHING PROCESS

(75) Inventor: Andrew Homola, Morgan Hill, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 09/390,887

(22) Filed: Sep. 7, 1999

(51) Int. Cl.[7] ................................................. B44C 1/22
(52) U.S. Cl. ............................. 216/22; 216/17; 216/31; 216/65; 29/603.01; 204/192.15
(58) Field of Search .............................. 216/17, 22, 31, 216/65; 29/603.01; 204/192.15

(56) References Cited

U.S. PATENT DOCUMENTS

| | | | |
|---|---|---|---|
| 4,325,182 A | * 4/1982 | Tefft et al. ...................... 29/583 |
| 4,833,001 A | 5/1989 | Kijima et al. ................ 428/141 |
| 5,087,481 A | * 2/1992 | Chen et al. ................... 427/129 |
| 5,314,522 A | 5/1994 | Kondo et al ..................... 65/31 |
| 5,430,594 A | * 7/1995 | Umebayashi et al. ........ 360/131 |
| 5,537,282 A | 7/1996 | Treves et al. ................ 360/135 |
| 5,723,033 A | * 3/1998 | Weiss ..................... 204/192.15 |
| 5,895,582 A | 4/1999 | Wilson et al. ................. 216/42 |

FOREIGN PATENT DOCUMENTS

JP    8-180351    7/1996

OTHER PUBLICATIONS

Kuo, et al., "Laser Zone Texturing on Glass and Glass–Ceramic Substrates", IEEE Transactions on Magnetics, Jan. 1997, pp. 944–946.

Teng, et al., "Laser Zone Texture on Alternative Substrate Disks", IEEE Transactions on Magnetics, Sep. 1996, pp. 3759–3761.

* cited by examiner

*Primary Examiner*—Randy Gulakowski
*Assistant Examiner*—Shamim Ahmed

(57) ABSTRACT

A method for manufacturing a magnetic disk comprises the acts of a) applying a laser beam to at least a portion of a silica-containing substrate, thereby forming a set of bumps or ridges; b) etching the substrate to remove the ridges and form a set of valleys where the ridges were previously formed; and c) depositing an underlayer, a magnetic layer, and a protective overcoat on the substrate. A lubricant layer is then formed on the disk. The valleys formed in the substrate reduce stiction exhibited by the magnetic disk. However, the valleys do not interfere with the fly height of a read-write head used in conjunction with the magnetic disk.

34 Claims, 3 Drawing Sheets

TEXTURING OF A LANDING ZONE ON GLASS-BASED SUBSTRATES BY A CHEMICAL ETCHING PROCESS

This patent incorporates by reference U.S. patent application Ser. No. 09/391,140, filed by Homola et al. entitled "Method of Manufacturing a Magnetic Disk Including a Glass Substrate and the Resulting Substrate" filed the same day as the present application.

This patent also incorporates by reference U.S. patent application Ser. No. 09/391,139, filed by Hsieh et al., entitled "Method for Manufacturing a Magnetic Disk Comprising a Glass Substrate", filed the same day as the present application.

BACKGROUND OF THE INVENTION

This invention pertains to a method for chemically texturing a landing zone on a substrate used to manufacture a magnetic disk.

FIG. 1 illustrates a typical prior art disk drive 1 comprising a magnetic disk 2 and a read-write head 3. Disk 2 is coupled to a motor 4 for rotating disk 2. Read-write head 3 is mounted on a suspension 5. When disk 2 rotates, an air bearing forms above disk 2, and read-write head 3 "flies" above magnetic disk 2. When disk drive 1 is turned off, read-write head 3 is positioned over a portion of disk 2 called the contact-start-stop, or "CSS" zone 2a. Concurrently, rotation of disk 2 slows, until it finally comes to a stop. When this happens, read-write head 3 comes into contact with disk 2 at CSS zone 2a. When disk drive 1 is turned on, disk 2 begins rotating. Eventually, the rotational velocity of disk 2 is sufficient to form an air bearing, thereby enabling head 3 to fly on that air bearing.

When disk 2 first begins rotating, head 3 drags along the surface of disk 2. Accordingly, steps must be taken to reduce or minimize static friction ("stiction") between disk 2 and head 3. One way of doing this is by providing a texture in CSS zone 2a. For disks using NiP-plated aluminum substrates, it has been suggested that a laser can be used to form texture bumps in the CSS zone. See, for example, U.S. Pat. No. 5,062,021, issued to Ranjan.

Ranjan is directed toward texturing a NiP-plated aluminum substrate. It is also known in the art that one can manufacture magnetic disks using glass substrates. (Glass has certain advantages over NiP-plated aluminum substrates, e.g. superior hardness and shock resistance.) It has also been suggested that one can form laser texture bumps on a glass substrate. See, for example, Kuo, et al., "Laser Zone Texturing on Glass and Glass-Ceramic Substrates", IEEE Trans. Magn. Vol. 33, No. 1, p. 944 et seq., which teaches that one can form bumps on a glass substrate to reduce stiction between the magnetic disk and a read-write head. Kuo indicates that when laser pulses from a $CO_2$ laser are applied to a glass substrate, the volume of the glass where the laser pulse strikes the glass expands, thereby forming a laser texture bump.

Magnetic disk drive manufacturers have been striving to provide higher recording densities in magnetic recording media. In order to achieve higher recording densities, manufacturers have had to use lower flying heights. (The flying height is the distance between read-write head 3 and a magnetic recording layer within magnetic disk 2.) Trying to reduce the flying height often means having to reduce the size of the texture bumps on the disk. However, by reducing the size of the texture bumps, stiction increases. Thus, there is a tradeoff between the flying height and the stiction between the head and the disk. What is needed is a way to reduce the flying height of the read-write head without increasing stiction.

SUMMARY

A method in accordance with the invention comprises the steps of applying a laser beam to a glass or glass-ceramic substrate, and applying an etchant to the substrate. In one embodiment, the etchant is acidic, and includes fluorine, e.g. fluoride ions. The portion of the substrate exposed to the laser beam etches much more rapidly than the portion of the substrate that is not exposed to the laser beam. Thus, any bump or ridge formed by the laser beam is etched away, resulting in a texture depression, or a texture valley. Of importance, this texture depression or valley reduces stiction without requiring one to sacrifice flying height.

After texturing, one or more underlayers, one or more magnetic layers and a protective overcoat are deposited on the substrate. The underlayer can be a material such as Cr, a Cr alloy, NiP, NiAl or other material.

A method in accordance with the invention can also be used to form servo marks on a disk. This is accomplished by exposing a portion of a substrate to a laser beam, etching the laser beam to form a depression, and depositing a magnetic film on the substrate. In one embodiment, the depression is of sufficient depth such that when a read-write head is positioned over the depression, it can detect the lack of a signal from the magnetic disk. (This lack of a signal is caused by the increased distance between the magnetic film and the read-write head, which in turn is caused by the presence of the depression.) The position of the depression is used as a servo mark.

DETAILED DESCRIPTION

Figure 2:
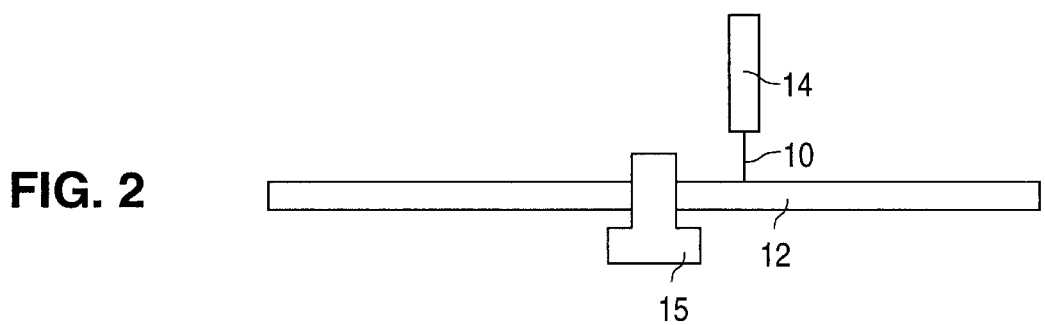
FIG. 2 illustrates in cross section a laser beam being applied to a glass substrate.

FIG. 2 illustrates a laser beam 10 being applied to a rotating glass substrate 12. Laser beam 10 is provided using a $CO_2$ laser 14, which produces a laser beam having a wavelength of about 10.6 $\mu$m. However, other types of lasers, producing beams having other wavelengths can also be used. It is preferable that the laser produces a beam having a wavelength such that the beam is readily absorbed by the substrate material.

In one embodiment, the laser beam is continuous, rather than pulsed. The power can be between 1 and 3 W, and the beam width can be about 20 $\mu$m. Substrate 12 is typically an amorphous glass, e.g. a borosilicate glass, aluminasilicate glass, or other type of glass. In addition, substrate 12 can be glass ceramic or quartz. In general, substrate 12 typically contains silica. Substrate 12 could also be another material having the property such that when it is irradiated with radiant energy (such as a laser beam), it etches at an increased rate.

Figure 3:
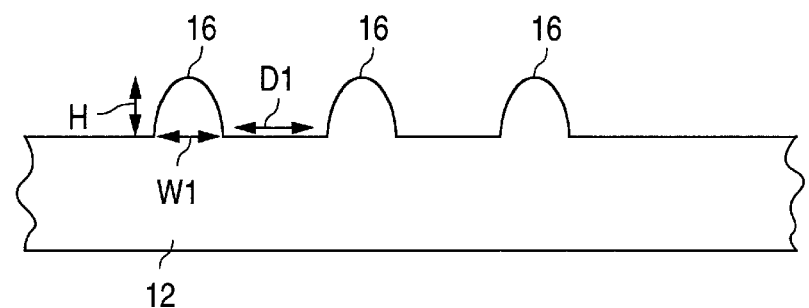
FIG. 3 illustrates in cross section the glass substrate after it has been subjected to a laser beam.

Substrate 12 is typically rotated, e.g. by a motor 15, while laser beam 10 is applied to substrate 12. (One type of fixture for applying a laser beam to a substrate is discussed in U.S. patent application Ser. No. 08/654,452, filed May 28, 1996 by Treves et al., incorporated herein by reference.) This results in a set of circumferential ridges 16 (FIG. 3). Ridges 16 typically have a height H of 10 to 35 nm, and a width W1 of about 2 to 100 $\mu$m, e.g. 22 $\mu$m. In one embodiment, ridges 16 are 20 mm high. However, height H of ridges 16 is not critical to the invention. The distance D1 between ridges 16 is typically a few microns up to about 10 $\mu$m.

It is not completely certain why ridges form in a glass or glass ceramic substrate after exposure to a laser. It is believed that for the case of glass ceramic material, the crystalline phase material in the substrate becomes amorphous, with an accompanying change in volume. It is further believed that that for the case of amorphous glass, the substrate material becomes less dense. In any event, ridges form in both glass and glass ceramic when exposed to a laser.

Figure 4:
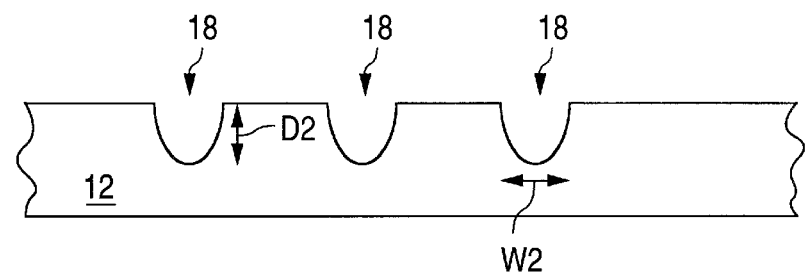
FIG. 4 illustrates in cross section the glass substrate after it has been subjected to an etch process.

After forming ridges 16, substrate 12 is subjected to an etching process using an aqueous acidic etchant comprising fluoride ions. In one embodiment, this etchant is a room temperature aqueous solution comprising ammonium bifluoride and an acid such as sulfuric acid or phosphoric acid. This etchant preferentially attacks the portion of substrate 12 that has been exposed to the laser beam. This is true for both amorphous glass and glass ceramic material. This preferential etching results in the formation of valleys 18 where ridges 16 were previously located (FIG. 4). In one embodiment, valleys 18 have a depth D2 of about 10 to 20 nm. However, valleys 18 could be formed to any appropriate depth.

Figure 4A:
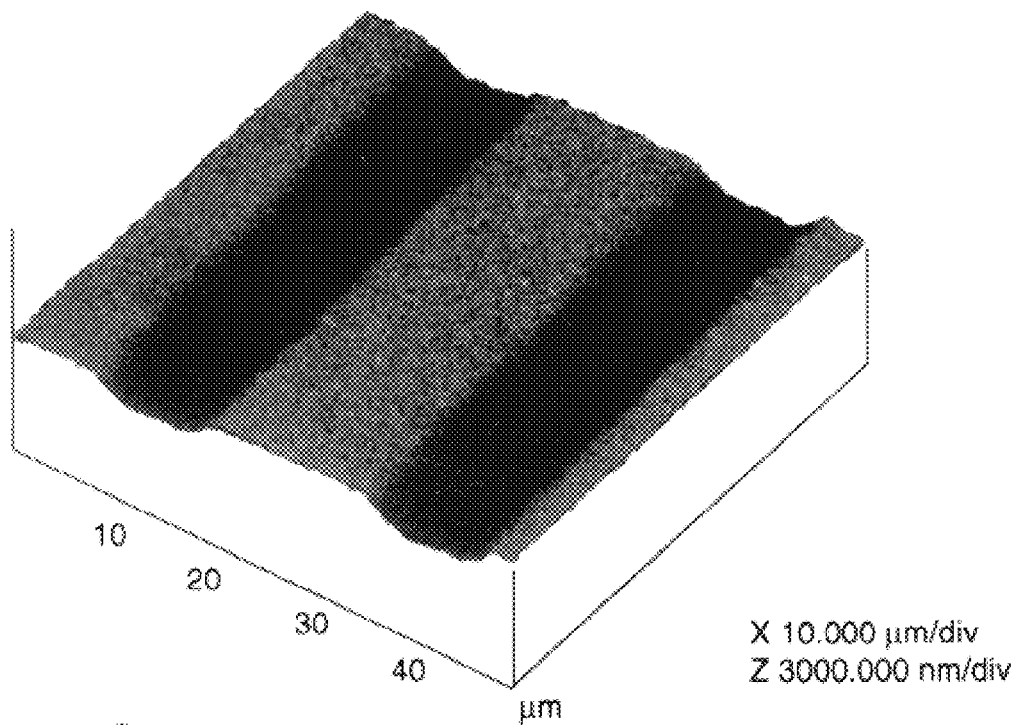
FIGS. 4A and 4B are AFM photographs showing a set of holes and valleys, respectively, formed in a substrate during a method in accordance with the present invention.

While FIG. 4 schematically illustrates the above-described phenomenon of valley formation, an actual atomic force microscope ("AFM") microphotographs is shown in FIG. 4A for a glass ceramic substrate in which the substrate was first subjected to a laser pulse and then etched. Thus, a hole was etched in the substrate, e.g. to a thickness of about 300 nm.

Figure 4B:
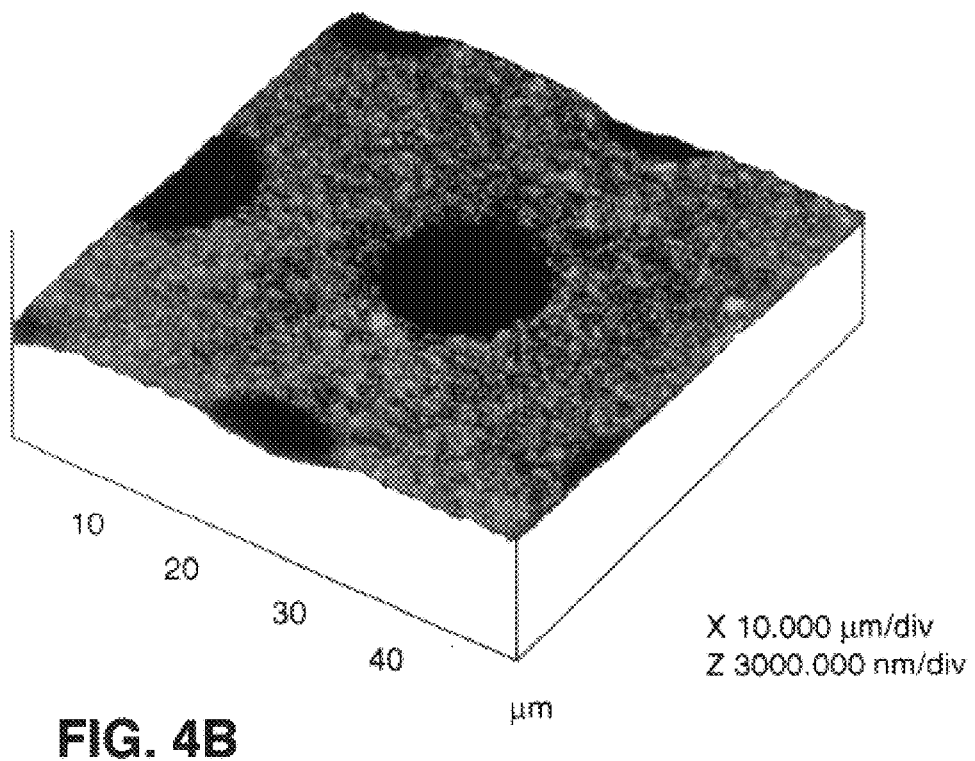

FIG. 4B is an AFM microphotograph showing the same phenomenon, except the laser provided a continuous beam. Therefore, valleys were formed in the substrate, instead of holes. The valleys had a depth of about 300 nm, and a width of about 10 microns.

The substrates for FIGS. 4A and 4B were glass ceramic substrates manufactured by NGK Corporation of Japan. However, as mentioned above, the same phenomenon occurs in amorphous glass.

The rate at which a glass or glass ceramic substrate (e.g. substrate 12) is etched depends not only on the properties of the glass material, but also on the chemical composition of the etching solution, the temperature, and time of exposure. Table I lists the depth of grooves, in nanometers, formed in an amorphous glass substrate (manufactured by Nippon Sheet Glass) subjected to several etching formulations at different laser powers. In all cases, the etching was done at room temperature and the etching time duration was one minute.

TABLE I

| Formulation | Laser Power (Watts) | | | | | |
|---|---|---|---|---|---|---|
| | 1.48 | 1.52 | 1.57 | 1.61 | 1.66 | 1.71 |
| 3% ammonium bifluoride and 5% H$_2$SO$_4$. | 125 | 160 | 210 | 240 | 270 | 320 |
| 1% ammonium bifluoride and 1% H$_3$PO$_4$ (pH 3) | 130 | 162 | 205 | 235 | 267 | 315 |
| 1% ammonium bifluoride | 73 | 130 | 182 | 195 | 192 | 182 |
| 0.25% ammonium bifluoride | 28 | 30 | 31 | 32 | 31 | 29 |

Generally, the higher the laser power, the higher the etch rate of the substrate material at the portion of the substrate exposed to the laser. This was true for all etching compositions, except the last composition, which had a low fluoride content and no acid (0.25% ammonium bifluoride). Also, the higher the fluoride concentration in the etching solution, or the higher the temperature, the greater the etch rate. Similar dependence of etching rates on the composition of the etching solutions and laser power was observed with NGK glass ceramic substrates.

Completion of the Magnetic Disk

Figure 5:
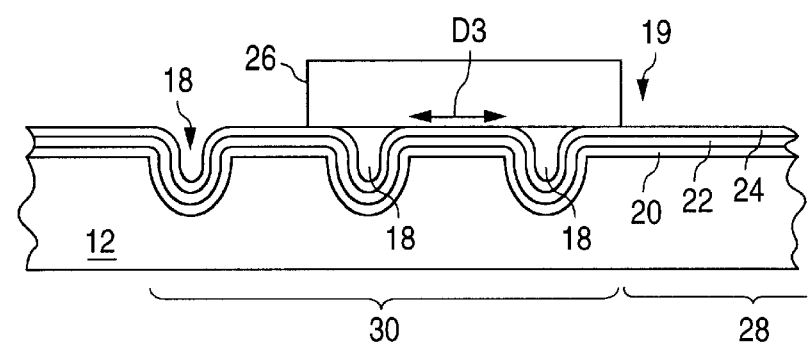
FIG. 5 illustrates in cross section a magnetic disk manufactured using the textured substrate of FIG. 4.

After etching, the various layers of the magnetic disk are deposited on substrate 12, e.g. as shown in FIG. 5 to form a magnetic disk 19. In one embodiment, these layers comprise one or more underlayers 20 (e.g. Cr, a Cr alloy, NiP or NiAl), one or more magnetic layers 22 (e.g. Co or a Co alloy), and a protective overcoat 24 (e.g. carbon or hydrogenated carbon). Layers 20, 22 and 24 are typically formed by sputtering. Of importance, the topology of substrate 12 is reflected in deposited layers 20, 22 and 24. (While three layers were formed on substrate 12, in other embodiments, other numbers of layers are formed on substrate 12.) After layers 20 to 24 are formed, a lubricant is typically applied to disk 19. Details concerning the sputtered layers in a magnetic disk are discussed in U.S. patent application Ser. No. 08/984,753, filed by Bertero, et al., incorporated herein by reference.

Also schematically shown in FIG. 5 is a read-write head 26 resting on disk 19. In one embodiment, valleys 18 are formed only in the CSS portion of disk 19. However, in other embodiments, valleys 18 are formed elsewhere on disk 19 as well. Of importance, valleys 18 reduce the stiction force between read-write head 26 and disk 19. Stiction depends upon the overall contact area between head 26 and disk 19, which in turn depends upon the distance D3 between valleys 18. Since the distance D1 between ridges 16 is a couple of microns, and in general less than or equal to about 10 microns, the distance D3 between valleys 18 is roughly the same as distance D1. By limiting distance D1 to the order of a few microns, one reduces the contact area between head 26 and disk 19, thereby reducing stiction force between head 26 and disk 19.

Valleys 18 have a width W2, which depends on width W1 of the ridges where the valleys were formed, which in turn depends in part on the width of the laser beam used to form the ridges. Typically, the wider the laser beam, the wider the ridges, and the wider the valleys. The laser beam is typically 10 to 200 $\mu$m wide, but preferably about 20 $\mu$m wide. The laser beam width is selected to control the valley width. It is preferred that at least five ridges (the area between valleys 18) are used to support the air bearing surface pad or rail of the read-write head. Accordingly, width W2 of valleys 18 is selected to ensure that this can be accomplished.

One important feature of the invention is that the stiction reducing topology of the CSS zone comprises a set of valleys extending into the surface of disk 19 instead of a set of bumps extending out of disk 19. Because of this, when the read-write head moves from the disk data zone 28 to CSS zone 30, head 26 does not have to collide with texture bumps or fly over texture bumps prior to landing. Thus, the topology of disk 19 provides an advantage not previously found in prior art textured media.

The ridges, valleys, and layer thicknesses of FIGS. 3, 4 and 5 are not drawn to scale. The diameter of substrate 12 is typically on the order of about 95 mm. The thickness of substrate 12 can be on the order 1 mm. The thickness of layers 20 to 24 are typically on the order of 5 to 30 nm. In one embodiment, underlayer 20 is 15 to 20 nm thick CrMo, a 1.5 to 2 nm thick CoCrTa layer is provided on underlayer 20, magnetic layer 22 is 17 nm thick CoCrPtTa is provided on the CoCrTa, and protective carbon overcoat 24 is 7 nm thick carbon. CSS zone 30 is typically a few millimeters wide, and is located toward the inner diameter of the disk. However, these dimensions are all merely exemplary, and other thicknesses and distances can be used.

While FIG. 5 shows a texture and the various magnetic disk layers formed on one side of substrate 12, typically, both sides of substrate 12 are textured, and the magnetic disk layers are deposited on both sides of the disk. In one embodiment, two lasers are used to texture substrate 12, one for each side of the substrate. In another embodiment, a single laser with a beam splitter and appropriate mirrors are used to texture each side of substrate 12, e.g. as described in the above-mentioned Treves et al. application.

Figure 1:
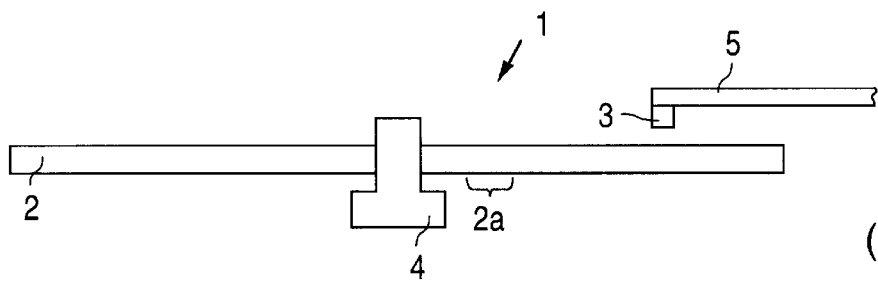
FIG. 1 illustrates in cross section a disk drive constructed in accordance with the prior art.

After completion of the disk, the disk is provided in a disk drive. The disk drive includes a motor for rotating the disk, a read-write head for reading data from and writing data to the disk, and a suspension for holding the read-write head. The configuration of the disk drive can be as shown in FIG. 1 above. Typically, read-write heads and suspensions are provided for reading and writing to the magnetic layers on both sides of the substrate.

Using the Method of the Present Invention to Provide Servo Marks on a Disk

The present invention can also be used to provide to encode servo tracking structures on a magnetic disk. It is known in the art to form pits in a magnetic disk as part of a servo mechanism structure that can be detected by a read-write head for ensuring that the head is aligned properly with a data track. An example of such a structure is described by Treves et al. in U.S. Pat. No. 5,537,282, incorporated herein by reference. Treves discusses bow pits formed in a magnetic disk can be used to generate servo signals for enabling an actuator to keep the read-write head aligned properly in the radial direction. Treves advocates forming pits in a disk using a stamping process.

Figure 6:
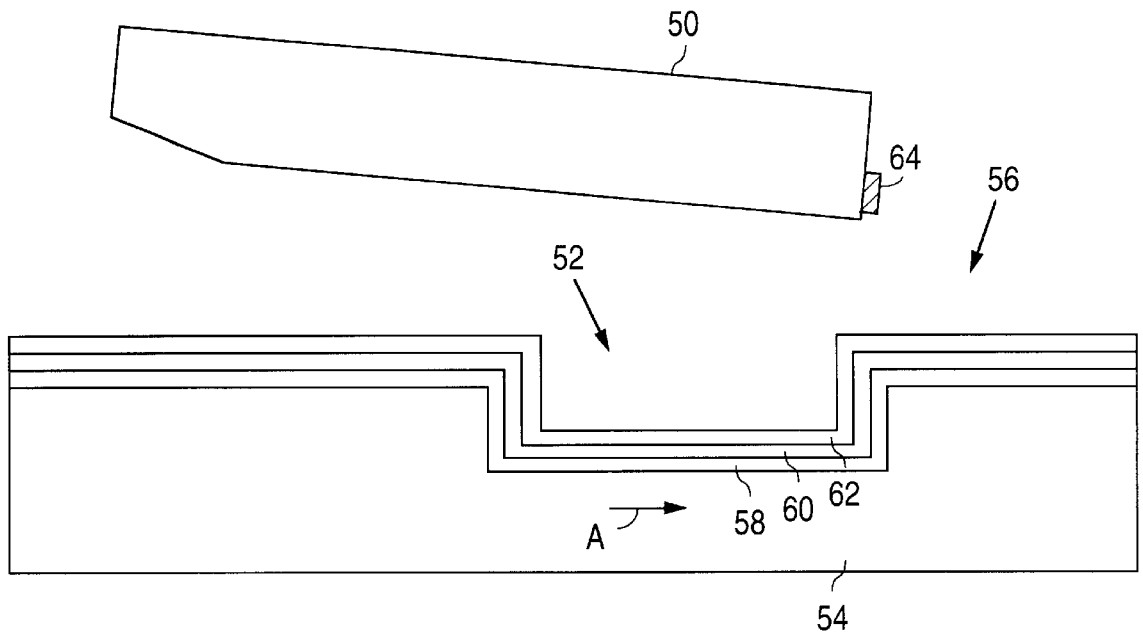
FIG. 6 schematically illustrates a read-write head flying over a servo mark pit formed in a magnetic disk.

During a process in accordance with the present invention, pits are etched in the substrate surface by exposure to a laser beam and etching as discussed above. FIG. 6 illustrates a read-write head 50 flying over a pit 52 etched into a substrate 54 of a magnetic disk 56. Magnetic disk 56 is rotating and moving in a direction A relative to read-write head 50. Magnetic disk 56 comprises an underlayer 58, a magnetic layer 60 and a protective overcoat 62. Read-write head 50 comprises a read-write element 64 for reading data from, or writing data to magnetic layer 60. Read-write head 50 can be a conventional read-write head, e.g. a thin film, ferrite or MR read-write head.

Of importance, when read-write element 64 is over pit 52, because of the large distance D4 between magnetic layer 60 and element 64, element 64 is unable to detect a signal from magnetic layer 60 (or alternatively, element 64 can detect that the signal from layer 60 is greatly attenuated. However, when element 64 is over other portions of disk 56, element 64 can detect the data recorded in magnetic layer 60.

Figure 7:
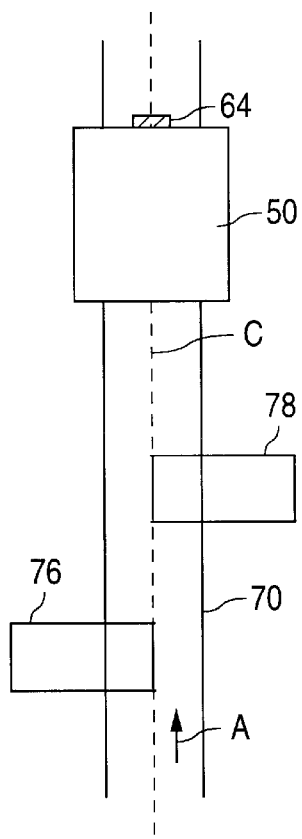
FIG. 7 illustrates in plan view a data track and a servo mark pit formed on each side of the data track.

Pits are formed in substrate 54 in a pattern that can be used as a servo mechanism. For example, FIG. 7 illustrates a data track 70. Pits 76 and 78 are formed on opposite sides of data track 70. If read-write head 50 is flying along track 70, when head 50 passes over pit 76, the signal from the magnetic film will partially drop off When head 50 passes over pit 78, the signal will again partially drop off. If head 50 is positioned properly over the center of track 70 (i.e. its read-write element is directly over center line C of track 70), the amount of drop-off associated with pits 76 and 78 will be equal. However, if head 50 is misaligned to the left, for example, the amount of drop-off associated with pit 76 will exceed the drop-off associated with pit 78. This inequality of drop-off is detected by a servo mechanism within the disk drive that will adjust the position of head 50 so that it is properly aligned with track 70.

While FIG. 7 shows pits 76, 78 extending to the center C of track 70, this is not necessary for practicing the invention.

The Treves patent provides additional information concerning the placement of pits in the substrate. The pits can be positioned as described in the above-incorporated Treves patent.

Pits can also be etched into disk 56 as a means for recording certain data, e.g. as described in the Treves patent. In accordance with another embodiment of the present invention, pits are formed in a substrate in a pattern that represents data, e.g. sector identification marks, etc. These pits are formed by exposure to a laser and subsequent etching.

While the invention has been described with respect to a specific embodiment, those skilled in the art will appreciate that changes can be made in form and detail without departing from the spirit and scope of the invention. For example, different dimensions such as thicknesses, widths, depths, and heights can be used. Different types of lasers could be used. Also, instead of using a continuous laser beam, a pulsed laser beam could be used. Different types of etchants, including different types of fluoride-containing solutions can be used, e.g. an HF solution. HF could be used alone or in a combination with other inorganic acids such as $HNO_3$ and $H_2SO_4$. Additives such as surfactants can be added to the etching solution. Etching can occur at temperatures other than room temperature. Instead of using a laser beam, other sources of radiant energy, e.g. focused light or IR radiation, can be used. Also, the substrate can be any material having the characteristic that being subjected to this radiant energy will significantly alter its etching rate characteristics. Accordingly, all such changes come within the invention.

I claim:

1. A method for making a magnetic disk comprising the acts of:

applying radiant energy to a silica-based substrate, wherein one or more protrusions are formed at the locations where said radiant energy is applied to said substrate;

etching said substrate to form one or more depressions at the locations where said radiant energy is applied to said substrate; and forming a magnetic film on said substrate.

2. Method of claim 1 wherein said substrate contains silica, and said act of applying radiant energy comprises applying a laser to said substrate.

3. Method of claim 2 further comprising the acts of applying an underlayer between said substrate and said magnetic film, and applying a protective layer to said magnetic layer.

4. Method of claim 2 wherein said laser is a CW laser, and said depressions are in the form of valleys formed in said substrate.

5. A method for making a magnetic disk comprising the acts of:

applying radiant energy to a substrate;

etching said substrate to form depressions at the locations where said radiant energy is provided to said substrate; and forming a magnetic film on said substrate, wherein said radiant energy forms ridges on said substrate, said ridges being eliminated during said act of etching.

6. Method of claim 1 wherein said act of etching is performed with an acidic solution comprising fluoride ions.

7. Method of claim 1 wherein said depressions form a CSS zone in the magnetic disk.

8. Method of claim 1 wherein said depressions form a portion of a servo mechanism in a magnetic disk drive.

9. Method of claim 1 wherein said substrate comprises glass ceramic.

10. A magnetic disk manufactured by the method of claim 1.

11. A magnetic disk drive comprising the magnetic disk of claim 10.

12. A method for treating a silica-based workpiece comprising:

applying radiant energy to said silica-based workpiece to thereby form one or more protrusions on said silica-based workpiece; and etching said silica-based workpiece to form one or more depressions at the locations where said radiant energy is applied to said workpiece.

13. Method of claim 12 wherein said workpiece is a substrate used during magnetic disk manufacturing and said treating results in the texturing of said substrate.

14. Method of claim 1 wherein said etching results in the texturing of said substrate to form a CSS zone such that the CSS zone contains said depressions but a zone of said substrate outside of said CSS zone does not contain said depressions, and the top surface of the substrate material inside said CSS zone but outside said depressions extends to substantially the same height as the top surface of the substrate in said zone of said substrate outside the CSS zone.

15. Method of claim 14 further comprising forming an underlayer between said substrate and said magnetic layer.

16. Method of claim 14 wherein said substrate is a silica-containing substrate.

17. Method of claim 16 wherein said substrate comprises glass or glass-ceramic.

18. Method of claim 14 wherein said depressions are in the form of valleys formed in said substrate.

19. Method of claim 1 wherein said substrate comprises glass.

20. Method of claim 1 wherein said depressions are formed only in selected portions of said disk.

21. Method of claim 1 wherein said depressions are formed only in a CSS zone of said disk.

22. A magnetic disk manufactured by the method of claim 14.

23. A magnetic disk drive comprising the magnetic disk of claim 22.

24. Method of claim 14 wherein said depressions are not formed outside of the CSS zone of said disk.

25. Method of claim 14 wherein said depressions are formed by applying radiant energy to portions of the substrate and then etching the substrate.

26. A method for making a magnetic disk comprising the acts of:

applying radiant energy to a substrate, said substrate comprising silica, said radiant energy forming one or more protrusions on said substrate;

etching said substrate to form one or more depressions at the locations where said radiant energy is applied to said substrate; and forming a magnetic film on said substrate.

27. A method for treating a workpiece comprising:

applying radiant energy to said workpiece, said workpiece comprising silica, said radiant energy forming one or more protrusions on said workpiece; and etching said workpiece to form one or more depressions at the locations where said radiant energy is applied to said workpiece.

28. Method of claim 1 wherein said depressions provide head position information for controlling head position over data tracks.

29. A disk drive comprising the disk of claim 10.

30. A magnetic disk manufactured by the method of claim 7.

31. Method of claim 1 wherein during said etching said one or more protrusions are etched to form said one or more depressions.

32. Method of claim 12 wherein during said etching said one or more protrusions are etched to form said one or more depressions.

33. Method of claim 26 wherein during said etching said one or more protrusions are etched to form said one or more depressions.

34. Method of claim 27 wherein during said etching said one or more protrusions are etched to form said one or more depressions.

* * * * *